Patented Oct. 3, 1944

2,359,340

UNITED STATES PATENT OFFICE 2,359,340

PROCESS OF PURIFYING ALUMINUM SULPHATE SOLUTION

John H. Walthall, near Sheffield, Ala., assignor to Tennessee Valley Authority, a corporation of the United States of America No Drawing. Application January 1, 1943, Serial No. 471,056

4 Claims. (Cl. 23—123)

(Granted under the act of March 3, 1883, as amended April 30, 1928; 370 O. G. 757)

The invention herein described may be manufactured and used by or for the Government for governmental purposes without the payment to me of any royalty thereon.

The present invention relates to the art of treating aluminum salt solutions and is particularly directed to the removal of iron from solutions obtained by the acid treatment of aluminiferous material.

The problem of removing iron from aqueous solutions of aluminum salts has been investigated extensively, but due to the similarity of action of most chemical reagents in respect to iron and aluminum, the problem of separating compounds of these materials has been found to be very difficult. The precipitation of the relatively small proportion of iron contained in aluminum salt solutions by numerous reagents has been proposed but in practically every case, either a relatively small proportion of the iron has been precipitated, excessive quantities of aluminum are also precipitated, or the precipitates formed are colloidal and extremely difficult to remove from the solution. It has been further suggested that the iron salt of certain inorganic acids be separated by the selective action of certain organic solvents.

The present invention is directed to a process of removing iron from aluminum salt solution by treating an aqueous solution of an aluminum salt with an amount of water-soluble thiocyanide sufficient to react with substantially only the iron content thereof to form ferric thiocyanide; by contacting the aqueous aluminum salt solution so treated with a nonaqueous selective solvent for thiocyanides which is substantially immiscible with said salt solution at a temperature and for a time sufficient to remove substantially all of the iron therefrom; and by oxidizing the ferrous iron present in said aqueous aluminum salt solution to the ferric condition concurrently with the extraction of the treated solution with said nonaqueous selective solvent.

It is evident that there are numerous factors which would influence conditions for the most satisfactory operation for the present process, the actual limits of which cannot be established except by detailed study of each type of aluminum salt solution employed, the specific reagent and solvent used therein, and the specific conditions under which they are applied.

One example of the operation of the present invention is given for the treatment of an aluminum sulphate solution containing an equivalent of 75 grams of $Al_2O_3$ and 0.8 grams of $Fe_2O_3$ with potassium thiocyanide. To one liter of said solution was added 6.8 grams of potassium thiocyanide, and the resulting solution, wherein the ratio of $CNS:Fe_2O_3$ is 14:1, was maintained at a temperature of from 5 to 7° C. and treated in a continuous countercurrent extraction unit with 7.5 liters of butyl acetate. A sufficient quantity of hydrogen peroxide was added during the progress of the extraction to maintain the iron in a ferric condition. The resulting immiscible layers of liquids were separated with the iron being removed in the butyl acetate water layer. The butyl acetate in this layer, together with the butyl acetate in the water layer, were recovered for reuse in the process. In the purified aluminum sulphate solution, the ratio $$\frac{Fe_2O_3}{Al_2O_3} \times 100$$

was 0.023, as compared with a value of 1.06 for the original impure solution. The treatment effected a 98% removal of the iron from the impure aluminum salt solution.

The present process is applicable for the removal of iron from any aluminum salt solution from which ferric thiocyanate can be produced. The concentration of the aqueous salt solution as far as the present process is concerned is usually of the order of 20% of the solution by weight. Alkali metal thiocyanides have been found to be particularly effective for the separation of iron by the present method, but of course their use involves the production of an aluminum salt solution which, while substantially free from iron, does contain alkali metal in an amount corresponding to the amount of thiocyanide used. Where the presence of the alkali metal in a purified aluminum sulphate solution is objectionable, calcium thiocyanide may be used for the formation of ferric thiocyanide with the subsequent separation of the calcium sulphate precipitate therein.

Any soluble thiocyanide (also called rhodanate, sulphocyanide, sulphocyanate, or thiocyanate) or thiocyanide capable of reacting in the presence of the aluminum salt solution to form a soluble ferric thiocyanide is suitable for use in the process. The amount of thiocyanide used is that required to cause a reaction with substantially all of the iron present. The iron in such a solution is usually present in a very small percentage, and consequently it appears to be necessary to have a substantial excess of thiocyanide over that required stoichiometrically to react with the iron in such a solution in order that the ferric thiocyanide therein may be substantially completely separated. The ratio of CNS to Fe₂O₃ may be up to the order of 14 to 1.

It is necessary that the iron in the aluminum salt solution be in the ferric condition in order that the ferric thiocyanide may be produced and selectively separated with the organic solvent. The iron may be partially or completely oxidized to the ferric state prior to the addition of the thiocyanide reagent. However, it has been found that an effective separation of iron as ferric thiocyanide may be obtained only when the oxidation is carried out or at least continued during the step of treatment with the selective solvent. Any reagent suitable for the oxidation of iron under these conditions may be employed.

There are a number of organic solvents which may be used for the selective solution of ferric thiocyanide. Both diethyl ether and butyl acetate have been used for this purpose, with the butyl acetate being effective in that with countercurrent extraction a smaller quantity of the butyl acetate is required to obtain a substantially complete separation of the ferric thiocyanide in the layer in which the organic solvent predominates. The extraction of the ferric thiocyanide may be carried out at temperatures of the order of 25 to 27° C. even though a 20% better extraction was obtained when the aluminum salt solution butyl acetate solvent mixture was maintained at 5 to 7° C.

It will be seen therefore that this invention actually may be carried out by the use of various modifications and changes without departing from its spirit and scope.

I claim:

1. A process of removing iron from an aluminum salt solution which comprises
   (a) Treating an aqueous solution of an aluminum salt with an amount of water-soluble thiocyanide sufficient to react with substantially the iron content thereof to form ferric thiocyanide,
   (b) Contacting the aqueous aluminum salt solution so treated with a nonaqueous selective solvent for thiocyanides which is substantially immiscible with said salt solution at a temperature and for a time sufficient to remove substantially all of the ferric thiocyanide therefrom, and
   (c) Oxidizing the ferrous iron present in said aqueous aluminum salt solution to the ferric condition concurrently with the extraction of the treated solution with said nonaqueous selective solvent.

2. A process of removing iron from an aqueous aluminum sulphate solution which comprises
   (a) Treating said aluminum sulphate solution with an amount of water-soluble thiocyanide sufficient to react with substantially the iron content thereof to form ferric thiocyanide,
   (b) Contacting the aluminum sulphate solution so treated with a nonaqueous solvent for thiocyanides which is substantially immiscible with said aluminum sulphate solution at a temperature and for a time sufficient to remove substantially all of the ferric thiocyanide therefrom, and
   (c) Oxidizing the ferrous iron present in said aqueous aluminum sulphate solution to the ferric condition concurrently with the extraction of the treated solution with said nonaqueous selective solvent.

3. A process of treating an aqueous aluminum sulphate solution to remove a relatively small proportion of iron contained therein, which comprises
   (a) Treating said aluminum sulphate solution with an amount of potassium thiocyanide sufficient to react with substantially the iron content thereof to form ferric thiocyanide,
   (b) Contacting the aluminum sulphate solution so treated with a nonaqueous solvent for thiocyanides which is substantially immiscible with said aluminum sulphate solution at a temperature and for a time sufficient to remove substantially all of the ferric thiocyanide therefrom, and
   (c) Oxidizing the ferrous iron present in said aqueous aluminum sulphate solution to the ferric condition concurrently with the extraction of the treated solution with said nonaqueous selective solvent.

4. A process of treating an aqueous aluminum sulphate solution to remove a relatively small proportion of iron contained therein, which comprises
   (a) Treating said aluminum sulphate solution with an amount of calcium thiocyanide sufficient to react with substantially the iron content thereof to form ferric thiocyanide,
   (b) Contacting the aluminum sulphate solution so treated with a non-aqueous solvent for thiocyanides which is substantially immiscible with said aluminum sulphate solution at a temperature and for a time sufficient to remove substantially all of the ferric thiocyanide therefrom, and
   (c) Oxidizing the ferrous iron present in said aqueous aluminum sulphate solution to the ferric condition concurrently with the extraction of the treated solution with said nonaqueous selective solvent.

JOHN H. WALTHALL.